United States Patent [19]
Chang et al.

[11] Patent Number: 5,812,622
[45] Date of Patent: Sep. 22, 1998

[54] OPERATOR WORK STATION FOR NUCLEAR POWER PLANTS

[75] Inventors: Soon-Heung Chang; Han-Gon Kim; Seong-Soo Choi; Jin-Kyun Park; Jin-Hyuk Hong, all of Taejon, Rep. of Korea

[73] Assignee: Korea Advanced Institute of Science and Technology, Taejon, Rep. of Korea

[21] Appl. No.: 714,228

[22] Filed: Sep. 16, 1996

[30] Foreign Application Priority Data

Sep. 13, 1995 [KR] Rep. of Korea .................. 1995-29864

[51] Int. Cl.⁶ .................................................. G21C 17/00
[52] U.S. Cl. .......................... 376/259; 376/216; 364/188; 345/1
[58] Field of Search ..................................... 376/215, 216, 376/248, 259; 345/1, 2, 3; 340/506, 524, 525, 825.06; 364/146, 188, 154, 527, 492, 551.01

[56] References Cited

U.S. PATENT DOCUMENTS

| | | | |
|---|---|---|---|
| 4,803,039 | 2/1989 | Impink, Jr. et al. | 376/216 |
| 4,957,690 | 9/1990 | Fennern | 376/216 |
| 5,355,395 | 10/1994 | Searola et al. | 376/259 |

OTHER PUBLICATIONS

Seong S. Cho et al., Development of an On–Line Fuzzy Expert System for Integrated Alarm Processing in Nuclear Power Plants, IEEE Trans. Nucl. Sci., 42:1406–1418(1995).
Soon H. Chang et al., Development of the On–Line Operator Aid System Oasys Using a Rule–Based Expert system and Fuzzy Logic for Nuclear Power Plants, Nucl. Technol, 112:266–294(1995).

Seong S. Choi et al., An Intelligent Human–Machine Interface for Next Generation Nuclear Power Plants, Proceedings of the Korean Nuclear Society Autumn Meeting, pp. 191–196(1995).

Jin H. Hong et al., Development of Advanced Annunciator System for Nuclear Power Plants, Proceedings of the Korean Nuclear Society Autumn Meeting, pp. 185–190(1995).

Soon H. Chang et al., Development Strategies of an Intelligent Human–Machine Interface for Next Generation Nuclear Power Plants, Proceedings NPIC & HMIT '96 (The 1996 American Nuclear Society International Topical Meeting on Nuclear Plant Instrumentation, Control, and Human–Machine Interface Technologies), pp. 1503–1510(1996).

*Primary Examiner*—Daniel D. Wasil
*Attorney, Agent, or Firm*—Darby & Darby

[57] ABSTRACT

The present invention relates to an operator work station for nuclear power plants which can provide plant information in an effective way during abnormal/emergency conditions so that the operator can take necessary actions to recover the nuclear power plants. The operator work station for nuclear power plants of the present invention comprises dynamic alarm console; system information console; computerized operating procedure console; system-alarm connecting system which connects the alarm console with the system information console; and, system-procedure connecting system which connects the system information console with the computerized operating procedure console. According to the operator work station, efforts and time required for the operator to judge for himself, and possibility of mistakes of judgement are properly excused, since the operator can easily recognize the system where abnormality occurs, based on the generated alarms.

20 Claims, 2 Drawing Sheets

OPERATOR WORK STATION FOR NUCLEAR POWER PLANTS

FIELD OF THE INVENTION

The present invention relates to an operator work station for nuclear power plants, more specifically, to an operator work station for nuclear power plants which can provide plant information in an effective way during abnormal/emergency conditions so that the operator can take necessary actions to recover the nuclear power plants.

BACKGROUND OF THE INVENTION

A nuclear power plant ("NPP") has been developed under an indisputable principle pursuing safety as the most important goal, since it bears the potential risk of the release of radioactive materials. Specifically, so-called "proven technology" clarifies that all technologies related to the safety of the NPP shall be validated and verified at the same or related industries.

Though safety problems of the NPP has been governed by the principle, from early 1980s, the "proven technology" principle has been proven that it can not employ highly developed new technologies such as computer science, digital control, human engineering, and artificial intelligence, etc. That is, the principle has revealed a shortcoming that measurement for NPP is simply carried out by employing old-fashioned analog control of 1960s', while a fossil power plant can be operated by one operator by employing new technologies into the plant. Moreover, TMI accident demonstrated that various and much information using alarm tiles, indicators, and control devices more than a few thousands may influence negative effects on the safety of NPP. Therefore, there are strong reasons for exploring and developing an improved main control room which is designed for simpler and easier operation.

In line with this necessity, large programs on advanced control rooms are underway in the active areas: the Nuplex 80+ developed by ABB-CE, the main control room of N4 developed by Framatome, the main control room of AP600 developed by Westinghouse, the advanced boiling water reactor(BWR) control room developed by international team of BWR manufactures, the main control room for next generation pressurized water reactors(PWRs) developed jointly by Japanese five PWR utilities and Mitsubishi group, and an Integrated Surveillance And Control System (ISACS), which have been developed as a part of the OECD Halden Reactor Project.

In those main control rooms, digital technology and automation employing microprocessor enable one or two operators to maintain an NPP in a normal state. In addition, aspects of human engineering are considered in the design of control room layout and information presentation.

S/Ws which play important roles in the main control rooms developed in various nations, can be classified into as followings: alarm processing/presentation system which processes effectively alarms from working sites and presents them to an operator, system information-presenting/control system which presents variables associated with the operation and controls power plant based on the variables, and operating procedure system which makes provisions against changes in generating power or accidents and guides proper operating procedure.

The conventional alarm system can not filter unnecessary information to recognize circumstances or present information for the operator to recognize easily, but arrange alarms in spatially fixed sites and only blinks alarm tiles corresponding to that alarms. While this kind of alarm system has an advantage that all activated alarms can be perceived without the operator's efforts, it has revealed the following shortcomings:

1. The operator can not clearly understand the circumstances in power plant, since many alarms generate beyond the operator's cognition under the special situations when safety has to be implanted.
2. The operator has difficulties in judging the states in power plant accurately, since there is no discrimination between important and unimportant alarms.

Recently, spatially assigned alarms have been worldwidely used together with variable and systematic alarm system employing CRT in order to overcome the shortcomings of prior art alarm systems. Also, efforts have been concentrated in the proper elimination or suppression of generating alarms and the clear conferring of priority among alarms. For example, Japanese Unexamined Patent No. (Hei)6-3482 discloses an alarm system where different location, color or size of alarms designates priority among alarms, and generating alarms and its associated messages are provided in separately assigned spaces. Also, UK patent laid-open publication No. 2,272,326 teaches an alarm system where alarm system, systematic information watching/operating system, and defense system are designed to employ 3 independent microprocessors.

According to the prior art alarm systems, judgement on where abnormality occurs in the power plant and what is the necessary actions against generating alarm depend totally on the operator's ability, since the alarm processing systems have been designed to be limited to alarm itself. That is, the operator has to judge from the alarms generated from the alarm processing systems, where abnormality occurs in the system, and has to search information corresponding to the system by himself, in order to take proper actions, even though various procedural documents have been prepared to excuse the possibility of mistakes taken by the operator during the operation of power plant.

The procedural documents of hard copy, however, present only step-wise procedures for the operator to follow, and all the procedures of watch, judgement, and control belong to the operator's duty. Naturally, development of computerized procedural documents have been explored in order to excuse the possibility of the operator's mistakes, such as computerized procedural documents used in N4 power plant in France, and suitable computerized procedural documents used in improved main control rooms in various nations.

These efforts to computerize the procedural documents, however, simply resulted in a summary of information of power plant required to perform each step of procedural documents. Accordingly, the prior art is proven to be less satisfactory in the sense that the operator has to search information provided by the systems directly associated with the changes, in order to perceive the changes in power plant which is caused by the operators activity.

SUMMARY OF THE INVENTION

In accordance with the present invention, the inventors developed an operator work station for nuclear power plants which can present plant information in an effective way during abnormal/emergency conditions, so that the operator can take necessary actions to recover the plants, when alarms indicating disorder of specific part and abnormal states of systems occur.

The primary object of the present invention is, therefore, to provide an operator work station for nuclear power plants enabling that the operator diagnoses abnormal states and takes necessary actions to recover the plants, finally to guarantee safe operation of the plants.

BRIEF DESCRIPTION OF DRAWINGS

The above and the other objects and features of the present invention will become apparent from the following description given in conjunction with the accompanying drawing, in which.

DETAILED DESCRIPTION OF THE INVENTION

The operator work station for nuclear power plants of the present invention comprises:

dynamic alarm console;

system information console;

computerized operating procedure console;

system-alarm connecting system which connects the alarm console with the system information console; and, system-procedure connecting system which connects the system information console with the computerized operating procedure console.

According to the operator work station, the alarm console has a systematic hierarchical structure which prescribes hierarchical relationships between alarms and systems to display the status of the systems, in a response to the generated alarms, and each of consoles is preferably composed of a different computer, and connected one another by the aid of LAN.

A preferred embodiment of the present invention is explained in more detail with references of the accompanying drawing, which should not be taken to limit the scope of the invention.

Figure 1:
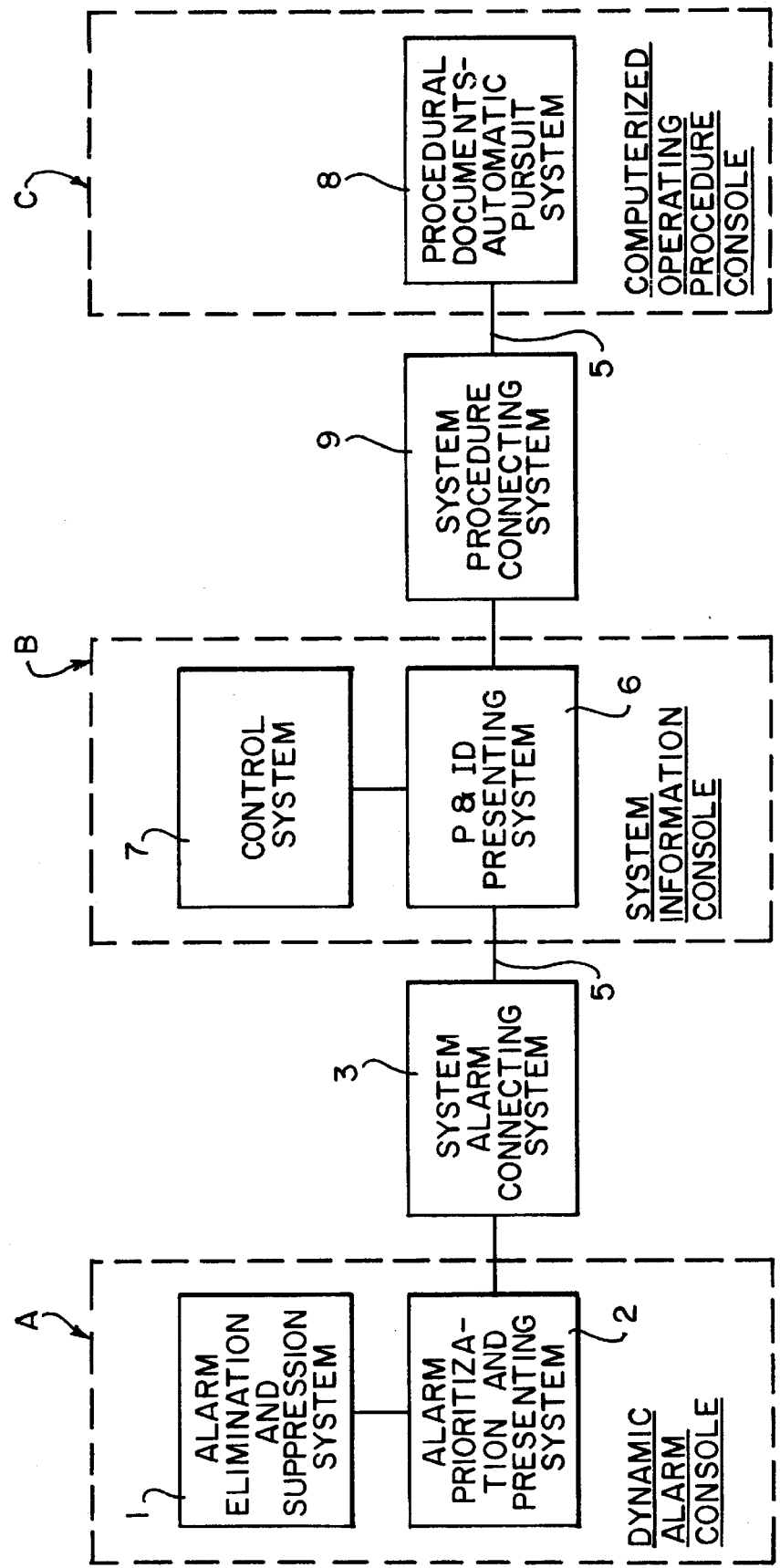
FIG. 1 is a schematic diagram showing an operator work station for nuclear power plants of the present invention.

FIG. 1 is a schematic diagram showing an operator work station for nuclear power plants according to the preferred embodiment of the invention.

Figure 2:
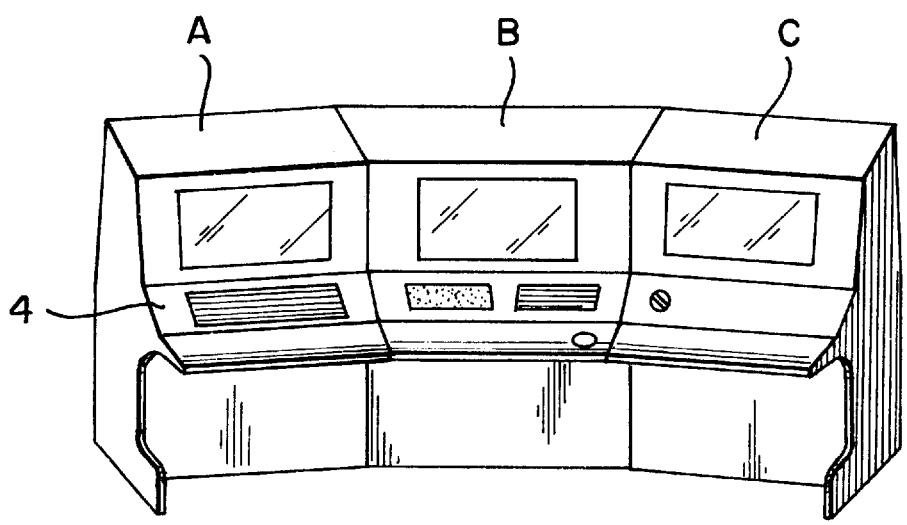
FIG. 2 is a perspective top front view of the operator work station of FIG. 1.

As can be seen in FIGS. 1 and 2, the operator work station of the invention comprises dynamic alarm console (A), system information console (B), computerized operating procedure console (C), system-alarm connecting system(3) which connects the alarm console(A) with the system information console(B), and system-procedure connecting system(9) which connects the system information console (B) with the computerized operating procedure console (C), each of which is composed of a different computer, and connected one another by LAN(5). In the operator work station of the invention, the alarm console(A) comprises alarm elimination and suppression system(1), and alarm prioritization and presenting system(2), the system information console(B) comprises P&ID(Process and Instrumentation Diagram) presenting system(6) and control system(7), and the computerized operating procedure console(C) comprises procedural documents-automatic pursuit system(8), respectively.

The alarm console(A) as shown in FIG. 2 represents the priority of alarms through monitor, which are classified into caution alarm, advisory alarm and informative alarm based on the priority of importance. On the other hand, the built-in alarm console(A) has a system alarm-presenting keyboard (4) having 64 buttons which correspond to individual system of NPP. The buttons blink in different colors such as red, orange and yellow depending on the level of abnormality of system, by which the operator perceives the abnormality in a system. The colors are determined by specified logical relationship according to the level of alarm generated in each system. The system information console(B) which is connected with the alarm console(A) by LAN(5) operates to provide P&ID of the corresponding system, when the operator presses the blinking button. On the P&ID, the location in the system where alarm generates is indicated in red color, which makes the operator find easily where the abnormality generates in the corresponding system, finally to recover it.

The computerized operating procedure console(C) provides step-wise procedural documents for normal and emergency operation to the operator in a computerized form, where condition of each step is examined based on the data obtained from real time, and then necessary actions are taken automatically in a response to the results. Further, the computerized operating procedure console(C) possesses selection switches of 'automatic' or 'manual' on the lower part of monitor, by which the operator himself can take necessary actions when automatic operation is not preferred. Also, information about power plants required for judgement of condition of each step is provided to the operator in a summarized data, and the system information console(B) connected by LAN(5) operates to provide corresponding P&ID automatically, when manual operation is possibly carried out.

According to the operator work station of the invention, alarms which are not necessary for cognition or presentation, among alarms generating in the power plant, are first eliminated and suppressed by the alarm elimination and suppression system(1). Among caution alarm, advisory alarm and informative alarm, one level of alarm is given to the remaining alarms by the alarm prioritization and presenting system (2), and the alarms having their own priority are presented on the monitor so that the operator can perceive the alarms easily. Also, the alarms having their own priority blink 64 buttons on the system alarm-presenting keyboard(4) by hierarchical structure between alarm and system as followings:

(1) When one or more caution alarms belonging to the corresponding system generate, the buttons corresponding to the system blink in red color.

(2) When one or more advisory alarms belonging to the corresponding system generate, the buttons corresponding to the system blink in orange color.

(3) When one or more informative alarms belonging to the corresponding system generate, the buttons corresponding to the system blink in yellow color.

In the conventional alarm processing and presenting system, the operator has to judge from alarms generated in the system where abnormality generates. Therefore, it is not easy for him to perceive where abnormality generates in the system and what level the abnormality is, when many alarms are generated. According to the present invention, the operator, however, can observe only alarms blinking on the system alarm-presenting keyboard(4). When the operator presses the blinking buttons, information inputed by the system-alarm connecting system(3) are transmitted to the P&ID presenting system(6) located in the neighboring computer via LAN(5), and then the P&ID corresponding the system is presented. As the parts in which alarms generate are indicated in red color in the presented P&ID, the operator perceives easily which parts of the corresponding system abnormality generates in, thus he can take necessary actions on the P&ID employing the control system(7).

On the other hand, during the operation or shutdown of NPP, each step of the procedural documents computerized by the procedural documents-automatic pursuit system(8) is provided to the operator in text and graphic forms. That is, the flow of procedural steps is indicated in a form of flow chart to ease prompt cognition of the operator, and detailed information about the states of power plant associated with each step and necessary actions are indicated in a form of text. And, the system(8) is designed so that whether condition of each step is satisfied or not, based on the information about the states of power plant, is automatically determined to perform the necessary control automatically under approval of the operator.

As the information is presented in a form of bar and trend graphs so that the operator may judge the condition of each step, being separated from the procedural documents-automatic pursuit system(8), the operator can make final decision based on his own judgement and information provided from the system as well. And, in the manual operation, the corresponding steps and names of the associated system are transmitted to the P&ID presenting system (6) located in the neighboring computer by the system-alarm connecting system(3) via LAN(5), and the P&ID corresponding to the system is presented automatically. Accordingly, in the case that the operator is to select manual operation mode, based on his own decision, he can perform the necessary control on the P&ID employing the control system(7).

According to the operator work station for nuclear power plants of the invention as described as above, following effects can be demonstrated:

(1) The operator can find easily the system where abnormality generates and prevent mistakes of judgement since alarms and systems possessing hierarchical structure show automatically the system where abnormality generates.

(2) Efforts and time required to search the associated P&ID to take necessary actions required to recover, can be reduced since alarms are connected organically together with P&ID.

(3) Physical and mental burdens which the operator bears during the performance of the steps and mistakes resulting therefrom, can be reduced with the aid of computerized and automated operating procedures.

(4) Efforts and time required to search the associated P&ID to perform manual operation, can be reduced since the computerized procedural documents are connected organically together with P&ID.

(5) The said effects (1) to (4) eases even a novice to understand and control a power plant like an expert.

(6) The prevention of mistakes of judgement, and the reduction of time and efforts, guarantee economical safe operation of NPP, since mistakes of judgement may cause more serious problems and long recovery time required to solve the problems is detrimental to the maintenance of plants.

As clearly illustrated and demonstrated as aboves, the present invention provides an operator work station for nuclear power plants which presents plant information in an effective way so that the operator can take necessary actions to recover the nuclear power plants. According to the operator work station, efforts and time required for the operator to judge for himself, and possibility of mistakes of judgement are excused, since the operator can easily recognize the system where abnormality occurs, based on the generated alarms. Also, according to the operator work station, by connecting alarm system with system information console which permits proper control of power plant based on P&ID(Process and Instrumentation Diagram), time and efforts required to search the system for the operator to take proper actions against the abnormal states are reduced, and information about power plants associated with each step in the procedural documents on normal and emergency operation and results therefrom are provided to the operator.

Although the preferred embodiments of the present invention have been disclosed for illustrative purpose, those who are skilled in the art will appreciate that various modifications, additions and substitutions are possible, without departing from the scope and spirit of the invention as disclosed in the accompanying claims.

What is claimed is:

1. An operator work station for a nuclear power plant which comprises:

a dynamic alarm console having a plurality of illuminable buttons implementing a systematic hierarchical structure of a plurality of alarms displayed by the illuminating buttons which prescribes hierarchical relationships between alarms generated by the alarm console and systems of the nuclear power plant;

a system information console for displaying a process and instrumentation diagram (P&ID);

a computerized operating procedure console;

a system-alarm connecting system which connects the alarm console with the system information console; and, a system-procedure connecting system which connects the system information console with the computerized operating procedure console.

2. The operator work station for the nuclear power plant of claim 1, wherein the systematic hierarchical structure of the alarm console displays the status of the systems, in a response to the generated alarms, by illuminating corresponding buttons according to a predetermined hierarchy.

3. The operator work station for the nuclear power plant of claim 1, wherein the alarm console comprises an alarm elimination and suppression system, and an alarm prioritization and presenting system.

4. The operator work station for the nuclear power plant of claim 1, wherein the system information console comprises a P&ID presenting system and a control system.

5. The operator work station for the nuclear power plant of claim 1, wherein the computerized operating procedure console comprises a procedural documents-automatic pursuit system.

6. The operator work station for the nuclear power plant of claim 1, wherein the dynamic alarm console comprises a keyboard having the plurality of buttons showing any system-wide abnormality of the systems of the nuclear power plant in a blinking way.

7. The operator work station for the nuclear power plant of claim 1, wherein the dynamic alarm console includes a computer in charge of alarm processing;

wherein the system information console includes a computer in charge of presenting and controlling the P&ID; and wherein the computer in charge of alarm processing is connected with the computer in charge of presenting and controlling the process and instrumentation diagram (P&ID) by a local area network (LAN) so that the existence and nonexistence of any abnormality of the systems of the nuclear power plant and the associated P&ID are hierarchically related to each other.

8. The operator work station for the nuclear power plant of claim 1, wherein for parts of the nuclear power plant where alarms are activated, the corresponding parts are indicated on the P&ID for an operator to perceive the indicated parts easily.

9. The operator work station for the nuclear power plant of claim 1, wherein the system information console includes a computer in charge of presenting and controlling the P&ID;

wherein the computerized operating procedure console includes a computer in charge of performing procedural documents-automatic pursuit which is connected with the computer in charge of presenting and controlling the P&ID by a local area network (LAN) so that operating steps permitting manual operation and the associated P&ID are hierarchically related to each other.

10. An operator work station for a nuclear power plant, the operator work station comprising:

a local area network (LAN);

a dynamic alarm console including:

systematic hierarchical display means, including a plurality of illuminable buttons, for providing a plurality of alarms which prescribes hierarchical relationships between alarms generated by the alarm console and systems of the nuclear power plant, the systematic hierarchical display means being responsive to the generated alarms for displaying the status of systems of the nuclear power plant corresponding to the generated alarms by illuminating corresponding buttons according to a predetermined hierarchy;

a system information console for displaying a process and instrumentation diagram (P&ID); and a computerized operating procedure console.

11. The operator work station of claim 10, wherein the alarm console includes:

an alarm elimination and suppression system; and an alarm prioritization and presenting system.

12. The operator work station of claim 10, wherein the system information console includes:

a P&ID presenting system; and a control system.

13. The operator work station of claim 10, wherein the computerized operating procedure console includes a procedural documents-automatic pursuit system.

14. The operator work station of claim 10, wherein the dynamic alarm console includes:

a keyboard having the plurality of illuminable buttons;

wherein the dynamic alarm console is responsive to any system-wide abnormality of the systems of the nuclear power plant for generating an illuminated blinking alarm through at least one of the illuminable buttons.

15. The operator work station of claim 10, wherein the dynamic alarm console includes a computer in charge of alarm processing;

wherein the system information console includes a computer in charge of presenting and controlling the P&ID; and wherein the computer in charge of alarm processing is connected with the computer in charge of presenting and controlling the process and instrumentation diagram (P&ID) through the LAN so that the existence and nonexistence of any abnormality of the systems of the nuclear power plant and the associated P&ID are hierarchically related to each other.

16. The operator work station of claim 10, wherein when a set of parts of the nuclear power plant have alarms associated therewith in an activated state, the set of parts are indicated on the P&ID for an operator to perceive the indicated parts with the associated activated alarms.

17. The operator work station of claim 10, wherein the system information console includes a computer in charge of presenting and controlling the P&ID; and wherein the computerized operating procedure console includes a computer in charge of performing procedural documents-automatic pursuit which is connected with the computer in charge of presenting and controlling the P&ID through the LAN so that operating steps permitting manual operation and the associated P&ID are hierarchically related to each other.

18. The operator work station of claim 10, further comprising:

a system-alarm connecting system which connects the alarm console with the system information console through the LAN; and a system-procedure connecting system which connects the system information console with the computerized operating procedure console through the LAN.

19. An operator work station for a nuclear power plant, the operator work station comprising:

a dynamic alarm console including:

systematic hierarchical display means, including a plurality of illuminable buttons, for providing a plurality of alarms displayed therein which prescribes hierarchical relationships between any alarms generated by the alarm console and systems of the nuclear power plant, the systematic hierarchical display means being responsive to the generated alarms for displaying the status of systems of the nuclear power plant corresponding to the generated alarms by illuminating corresponding buttons according to a predetermined hierarchy;

a system information console for displaying a process and instrumentation diagram (P&ID);

a computerized operating procedure console; and a local area network (LAN) including:

a system-alarm connecting system which connects the alarm console with the system information console; and a system-procedure connecting system which connects the system information console with the computerized operating procedure console.

20. The operator work station of claim 19, wherein the dynamic alarm console includes:

a keyboard having the plurality of illuminable buttons;

wherein the dynamic alarm console is responsive to any system-wide abnormality of the systems of the nuclear power plant for generating an illuminated blinking alarm through at least one of the illuminable buttons.

* * * * *